US010006507B2

(12) United States Patent
Lee et al.

(10) Patent No.: US 10,006,507 B2
(45) Date of Patent: Jun. 26, 2018

(54) AXIALLY ACTING ACTUATOR FOR MULTI-MODE CLUTCH MODULE

(71) Applicant: BorgWarner Inc., Auburn Hills, MI (US)

(72) Inventors: Brett John Lee, Southfield, MI (US); Roy Keith Martin, Marlette, MI (US); Robert Francis Keller, Chesterfield, MI (US); Joel Maguire, Northville, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days. days.

(21) Appl. No.: 15/303,749

(22) PCT Filed: Apr. 17, 2015

(86) PCT No.: PCT/US2015/026307
§ 371 (c)(1),
(2) Date: Oct. 13, 2016

(87) PCT Pub. No.: WO2015/164190
PCT Pub. Date: Oct. 29, 2015

(65) Prior Publication Data
US 2017/0138416 A1    May 18, 2017

Related U.S. Application Data

(60) Provisional application No. 61/982,068, filed on Apr. 21, 2014.

(51) Int. Cl.
*F16D 41/16* (2006.01)
*F16D 23/14* (2006.01)
*F16D 23/12* (2006.01)

(52) U.S. Cl.
CPC ............. *F16D 41/16* (2013.01); *F16D 23/14* (2013.01); *F16D 2023/123* (2013.01)

(58) Field of Classification Search
CPC ..... F16D 41/16; F16D 23/14; F16D 2023/123
See application file for complete search history.

(56) References Cited

U.S. PATENT DOCUMENTS 4,382,495 A * 5/1983 Fleitas ............... B60K 17/3515
180/247
4,874,069 A * 10/1989 Lederman ............. F16D 41/067
192/113.36

(Continued)

OTHER PUBLICATIONS

International Search Report and Written Opinion from related International Application No. PCT/US2015/026307; report dated Jul. 17, 2015.

*Primary Examiner* — Jacob S. Scott
*Assistant Examiner* — Tinh Dang
(74) *Attorney, Agent, or Firm* — Miller, Matthias & Hull LLP

(57) ABSTRACT

A multi-mode clutch module includes first and second races, and a plurality of race engagement mechanisms situated between the races. The module incorporates an actuator sleeve having an axially acting actuator cam finger. The cam finger is configured with variable radial thicknesses to provide a plurality of predetermined fixed positions for contacting the race engagement mechanisms to cause the engagement mechanisms to selectively interact with the races. The actuator sleeve is thus adapted to control axial movement of the actuator cam finger between at least two axially spaced positions in one embodiment. In other embodiments within the scope of this disclosure, the actuator cam finger may be adapted to move axially among any number of predetermined positions to operatively permit or prevent transmittal of torque between the first and second (Continued)

races, irrespective of the relative rotational direction of the races.

20 Claims, 3 Drawing Sheets

(56) References Cited

U.S. PATENT DOCUMENTS

| | | | |
|---|---|---|---|
| 6,571,926 B2 | 6/2003 | Pawley | |
| 6,691,847 B2 * | 2/2004 | Kerr | F16D 41/066 |
| | | | 180/248 |
| 7,743,678 B2 * | 6/2010 | Wittkopp | F16D 41/16 |
| | | | 192/43.1 |
| 8,132,658 B2 | 3/2012 | Kawai et al. | |
| 9,151,345 B2 * | 10/2015 | Showalter | F16D 41/16 |
| 9,556,901 B2 * | 1/2017 | Wheals | F16C 19/52 |
| 2003/0019708 A1 | 1/2003 | Goto et al. | |
| 2007/0278061 A1 | 12/2007 | Wittkopp et al. | |
| 2008/0223681 A1 | 9/2008 | Stevenson et al. | |
| 2009/0266667 A1 | 10/2009 | Samie et al. | |
| 2017/0159704 A1 * | 6/2017 | Wheals | F16C 25/06 |

* cited by examiner

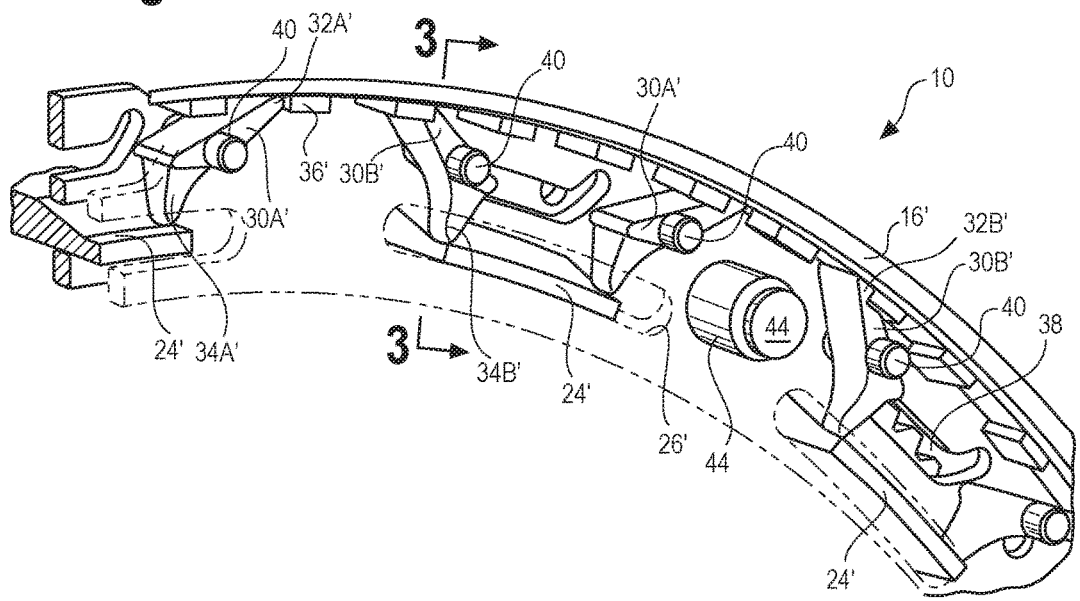
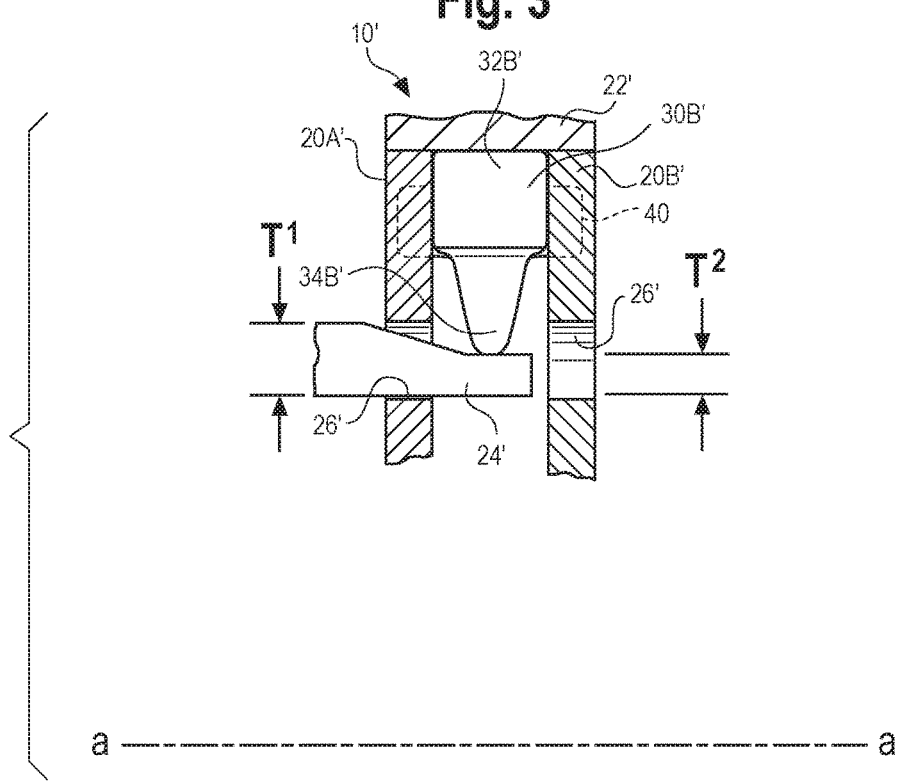

AXIALLY ACTING ACTUATOR FOR MULTI-MODE CLUTCH MODULE

CROSS-REFERENCED TO RELATED APPLICATIONS

This is a non-provisional application based on, and claiming priority under 35 U.S.C. 119(e) to, U.S. Provisional Patent Application Ser. No. 61/982,068, filed on Apr. 21, 2014.

FIELD OF DISCLOSURE

The present disclosure relates generally to overrunning multiple mode clutches as often used with gearsets in automatic transmissions, and more particularly to clutch actuators employed in the operation of such clutches.

BACKGROUND OF DISCLOSURE

Although the present disclosure has applicability beyond automotive, an automotive example and discussion is herein provided for context only; i.e., to specifically demonstrate at least one potential area of its utility.

Accordingly, an automotive vehicle includes an internal combustion engine containing a rotary crankshaft configured to transfer motive power from the engine through a driveshaft to turn wheels for moving the vehicle. A transmission is typically interposed between engine and driveshaft components to selectively control torque and speed ratios between the crankshaft and driveshaft. In a manually operated transmission, a corresponding manually operated clutch may be interposed between the engine and transmission to selectively engage and disengage the crankshaft from the driveshaft to facilitate manual shifting among available transmission gear ratios.

On the other hand, if the transmission is automatic, the transmission will normally include an internal plurality of automatically actuated clutches adapted to dynamically shift among available gear ratios of various gearsets without requiring driver intervention. A plurality of the clutches, also herein called clutch units or modules, is incorporated within such transmissions to facilitate automatic gear ratio changes.

One of the clutch modules of an automatic transmission associated with first (low) and reverse gear ratios may be normally situated at the front of the transmission and closely adjacent the engine crankshaft. The clutch may have an inner race and an outer race disposed circumferentially about the inner race. One of the races, for example the inner race, may be drivingly rotatable in only one direction. The inner race may be selectively locked to the outer race via an engagement mechanism such as, but not limited to, a roller, a sprag, or a pawl, as examples. In the one direction, the inner race may be effective to directly transfer rotational motion from the engine to the driveline.

Within the latter system, the outer race may be fixed to an internal case or housing of an associated planetary member of the transmission. Under such circumstances, in a first configuration the inner race may need to be adapted to drive in one rotational direction, but to freewheel in the opposite direction in a configuration referred to as overrunning. Those skilled in the art will appreciate that overrunning may be particularly desirable under certain operating states, as for example when a vehicle is traveling downhill. In such circumstance, a driveline may occasionally have a tendency to rotate faster than its associated engine crankshaft. Providing for the inner race to overrun the outer race may act to reduce drag and/or spin losses, for example.

In a second configuration, such as when a vehicle may be in reverse gear, the engagement mechanisms may be adapted for actively engaging in both rotational directions of the inner race, thus not allowing for the overrunning condition in the non-driving direction.

In yet other configurations, a clutch module may switch between modes adapted to be locked in another direction of rotation in a third mode, and to freewheel in both directions of rotation in an alternate, or fourth, mode.

Actuators designed and adapted to switch clutch modules between their operative modes have traditionally been limited to rotary movements for achieving their actuation functions. One example is provided in U.S. Pat. No. 7,101,306, which teaches use of a pair of actuator cams 26 adapted to rotate or "clock" between angular limits to selectively engage and disengage pawls 24 for torque transmission between, or the freewheeling of, inner and outer races 12, 18. However, some clutch module design envelope limitations may more conveniently lend themselves to actuators configured to move in some manner other than rotatably to provide actuation. Such alternate actuation movement could enable clutch module designers significantly more latitude by providing greater flexibility in potential design arrangements.

SUMMARY OF DISCLOSURE

In accordance with one aspect of the disclosure, an axially acting actuator may be configured for use with a multi-mode clutch module of an automatic transmission. In one disclosed embodiment, a clutch module includes inner and outer races concentrically disposed about a common axis. Engagement mechanisms, such as pawls, are circumferentially positioned between the inner and outer races, and the actuator includes an actuator sleeve having axially extending arms with cam fingers. The cam fingers move axially, and are configured to interact with and to toggle the engagement mechanisms between at least two directional torque control modes of the clutch module.

In accordance with another aspect of the disclosure, the actuator sleeve is configured to rotate with the inner race of the clutch module, the inner race comprising a pair of side plates fixedly secured together, and including at least one aperture. The aperture receives the cam finger and accommodates axial movement of the finger therethrough as induced via axial movement of the actuator sleeve.

In accordance with yet another aspect of the disclosure, the actuator sleeve is configured for rotation with the outer race of the clutch module rather than the inner race. The cam finger interfaces with the engagement mechanisms to provide a first locked actuator mode, wherein the inner race may be locked to the outer race in both driving and non-driving rotational directions.

In accordance with yet another aspect of the disclosure, another actuator mode provides for disengaged inner and outer races to freewheel with respect to one another in both driving and non-driving rotational directions.

In accordance with yet another aspect of the disclosure, a multi-mode clutch module includes an actuator adapted to selectively move the cam fingers between more than two axial positions, at least one position locking the inner and outer races together in at least one of its rotational directions and to freewheel in the opposite rotational direction, and at least another position allowing the inner and outer races to freewheel with respect to each other in both rotational directions.

These and other aspects and features of the present disclosure may be better appreciated by reference to the following detailed description and accompanying drawings.

BRIEF DESCRIPTION OF DRAWINGS

FIG. 2 is a perspective fragmentary view of a second embodiment of the disclosed clutch module, shown without one of its side plates to better reveal component details.

FIG. 3 is a cross-section of the embodiment of FIG. 2, as viewed along lines 3-3 of FIG. 2.

It should be understood that the drawings are not to scale, and that the disclosed embodiments are illustrated only diagrammatically and in fragmentary or partial views. It should also be understood that this disclosure is not limited to the particular embodiments illustrated herein.

DETAILED DESCRIPTION

Figure 1:
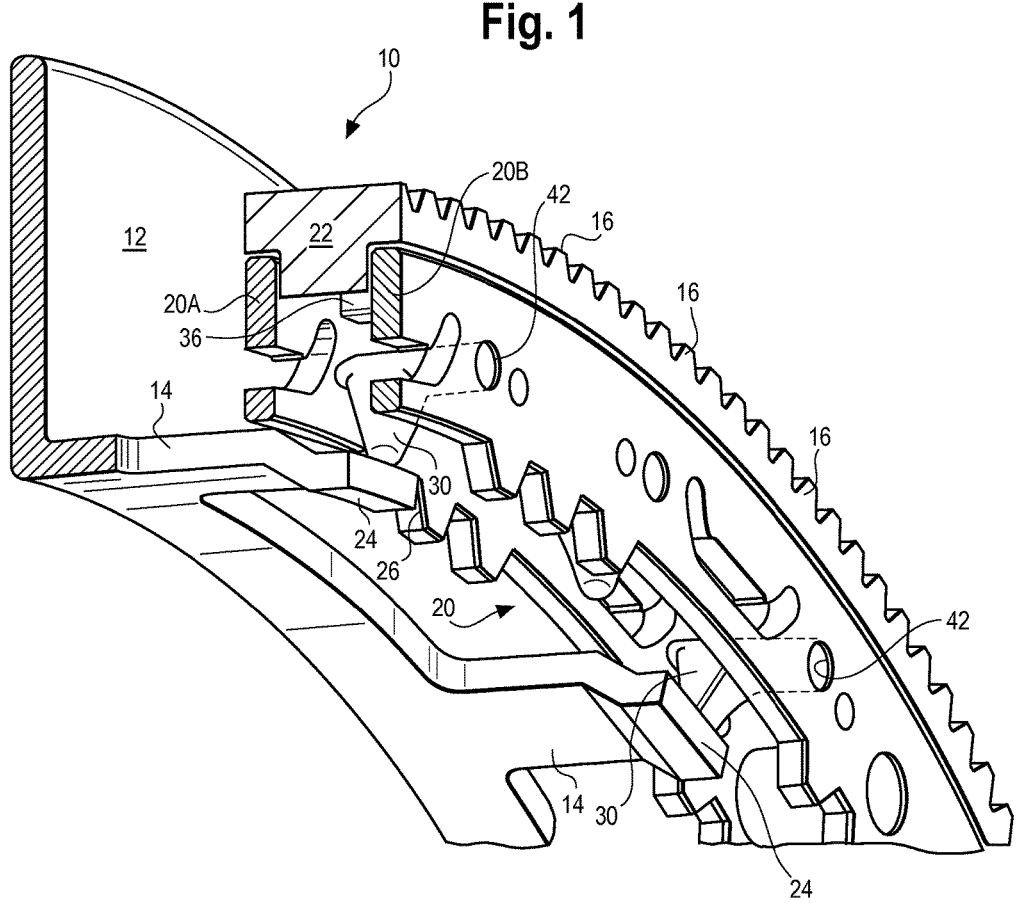
FIG. 1 is a fragmented perspective view of a first embodiment of a clutch module that incorporates an axially acting actuator cam finger constructed in accordance with the present disclosure.

Referring initially to FIG. 1, a multi-mode clutch module 10 may be utilized as a sub-unit of a vehicular automatic transmission (not shown). Such transmission may be part of an all-wheel drive system (not shown) as employed in a vehicle (not shown), as just one example. The clutch module 10 includes an annular actuator sleeve 12 to which an axially extending cam arm 14 may be integrally attached. As shown and described herein, the clutch module 10 may be incorporated within a forward or reverse gearset (neither shown).

A plurality of circumferentially spaced cogs 16 defines an exterior of the clutch module 10. An inner race 20 is defined by a pair of coaxially spaced first and second plates 20A, 20B. An outer race 22 circumferentially surrounds the inner race for relative rotation therewith, and the outer race 22 of the embodiment of FIG. 1 contains the noted circumferentially spaced cogs 16. The cogs 16 are adapted to mate with a planetary transmission component (not shown), as those skilled in the art will appreciate.

An actuator cam finger 24 is fixed to the cam arm 14. Both the cam arm 14 and the cam finger 24 are rigidly fixed to the actuator sleeve 12. In the environment of an automatic transmission, the actuator sleeve 12 may be moved axially by means of a shift fork (not shown). In the described embodiment, a plurality of circumferentially spaced actuator cam fingers 24 extend through slots 26 to engage race engaging mechanisms, such as the pawls 30, shown. The pawls 30 are adapted to angularly shift between positions configured to selectively cause either engagement or disengagement of the inner and outer races 20, 22. In the described embodiment, the cam fingers 24 collectively define an inner diameter of the actuator sleeve 12.

In the configuration of FIG. 1, a simple one-way clutch module is adapted to permit freewheeling in one rotational direction and to lock the races together in the opposite direction. Axial movement of the sleeve 12 will cause axial movement, i.e. linear translational displacement, of the fingers 24 to a position of contact between the fingers 24 and the pawls 30 to cause locking engagement of the races. Axial refraction of the fingers 24 will remove them from the pawls, thereby allowing the races to freewheel with respect to one another, as those skilled in the art will appreciate.

Referring now to FIGS. 2 and 3, a clutch module 10' may now be described as a second embodiment offering different operational characteristics. The clutch module 10' is a four-way module, albeit one adapted to provide only a locked race mode in both rotational directions or a freewheeling race mode in both directions, as will be appreciated by those skilled in the art. For this purpose, the clutch module 10' incorporates two sets of opposed pawls 30, i.e., forward pawls 30A' and reverse pawls 30B', as shown.

In the embodiment of FIG. 2, the actuator cam finger 24' is configured to be wide enough to simultaneously engage one forward pawl 30A' and one reverse pawl 30B' of the two adjacently opposed sets of pawls. The configuration of FIG. 2 provides an example of the flexibility of the disclosed axially engaging actuator cam fingers 24'.

Referring now also to FIG. 3, it will be noted that each pawl 30A', 30B' incorporates a toe 32A', 32B' and heel 34A', 34B', respectively. The toes 32A', 32B' are configured to interact with an array of circumferentially spaced, radially inwardly projecting, notches 36 in the outer race 22'. For this purpose, each heel 34A', 34B' is configured for being selectively moved by an axially extending finger 24' against the force of a spring 38 (FIG. 2).

In the configuration shown, a default position is that the races will freewheel unless the spring force of 38 is overcome via displacement of the pawl heel 34 by means of the finger 24'. Conversely, an opposite condition can be employed wherein the spring would urge the pawls into a default position of locked races. In addition, although the spring 38 as shown is a leaf style spring, a coil spring or numerous other varieties of springs may be as effectively utilized.

Each of the pawls 30 has an axially extending boss 40 configured to extend into aligned apertures 42 (best seen in FIG. 1) of the inner race side plates 20A and 20B, and be trapped between the plates 20A and 20B. As such, the plates are rigidly secured together along the axis a-a (FIG. 3) by rivets 44 (FIG. 2).

Referring now specifically to FIG. 3 with continued reference to FIG. 2, the actuator cam finger 24' may include at least two thicknesses T1 and T2 for controlling interactions between the fingers 24' and the heels 34A' and 34B' of the pawls 30A' and 30B'. In the position shown, the races are adapted to freewheel. When the cam finger 24' is moved axially right inwardly, the thicker portion T1 of the actuator cam finger 24' will permit engagement with the heels sufficient to toggle the pawl 30 into the race locking position.

Figure 4:
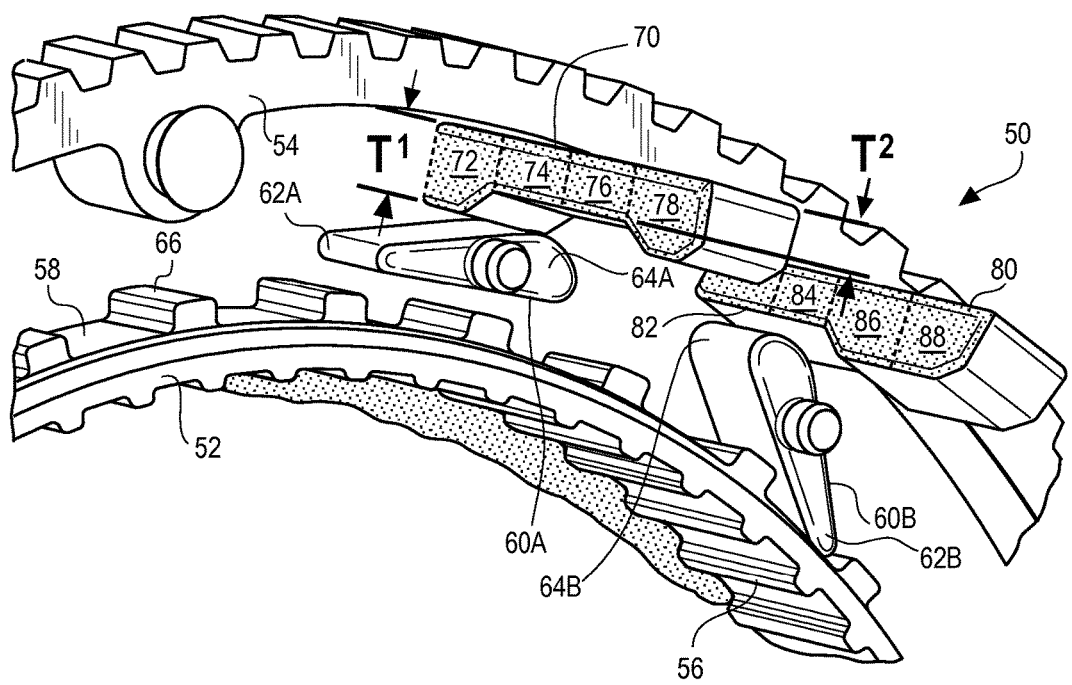
FIG. 4 is a perspective fragmentary view of a third embodiment of the clutch module.

Referring now to FIG. 4, a clutch module 50 offers a third embodiment that operates as a four-way module in which the inner and outer races 52 and 54 may be adapted to lock in both directions of rotation, freewheel in both directions of rotation, lock together in one direction of rotation and freewheel in the opposite, or lock together in the opposite direction of rotation, while freewheeling in the reverse direction. The clutch module 50 has an inner race 52 circumferentially surrounded by an outer race 54, the inner race 52 having a plurality of circumferentially spaced cogs 56, analogous to the spaced cogs 16 of the outer race 22 of FIG. 1. In this embodiment, notches 58, defined by a circumferential array of radially outwardly projecting teeth 66, are adapted to interface with the toes 62 A, 62 B of pawls 60A, 60B, respectively. As such, the pawls 60 of this embodiment interact with the inner race to lock the inner and outer races 52, 54 together, in contrast to interaction between toes 32 of pawls 30 with the outer race 22 of FIG. 1 for locking the races 20, 22 together. Moreover, the pawls 60 are adapted to be spring-loaded into a race locked position, rather than into a freewheeling position as described with respect to the pawls 30 of the embodiment of FIG. 1.

In the fragmentary depiction of FIG. 4, only two adjacent actuator cam fingers 70, 80 are depicted. A circumferential array of such fingers 70, 80 are configured to interface with a like array of forward and reverse opposing pawls 60A, 60B, respectively. The cam fingers 70, 80 extend from cam arms (not shown) which extend from an actuator sleeve (not shown), analogously to the described embodiments of FIGS. 1 and 2. In this third embodiment, however, the four-way actuation system of the clutch module 50 is configured to accommodate opposed, i.e. forward and reverse, pawls as the embodiment of FIG. 2.

Each of the cam fingers 70, 80 has four axial positions for interacting with respective heels of 64A, 64B of the pawls 60A and 60B, and each of the axial positions of the cam fingers 70, 80 is associated with a thickness of either T1 or T2, as depicted. In each case, the greater thickness T1 functions to interact with a heel 64A, 64B to displace the respective heel against a spring force for selective disengagement of the races 52 and 54 in any desired manner, and irrespective of relative rotations of the races.

For example, the actuator cam finger 70 is shown in position 72 which has a thickness T1, wherein the heel 64A of the pawl 60A is positioned to have its toe 62A displaced from the inner race 52. In the same actuator sleeve position, the actuator cam finger 80 will be in a corresponding position 82 in which the cam finger 80 thickness is T2. In that position, the toe 62B of the opposed or reverse pawl 60B will be spring-loaded into engagement with the inner race 52 as shown. Thus, all four positions along with the various finger position thicknesses may be described in accordance with the following chart. Specifically, the chart lists respective finger positions with clutch module race configurations for a hypothetical set of forward and reverse cam fingers 70, 80:

|                        | Forward Cam Finger 70 | Reverse Cam Finger 80 |
|------------------------|------------------------|------------------------|
| Finger Position        | 72                     | 74                     |
| Finger Thickness       | T1                     | T2                     |
| Pawl Toe Position      | Disengaged             | Engaged                |
| Configuration of Races | Freewheel              | Locked                 |
| Finger Position        | 74                     | 84                     |
| Finger Thickness       | T2                     | T2                     |
| Pawl Toe Position      | Engaged                | Engaged                |
| Configuration of Races | Locked                 | Locked                 |
| Finger Position        | 76                     | 86                     |
| Finger Thickness       | T2                     | T1                     |
| Pawl Toe Position      | Engaged                | Disengaged             |
| Configuration of Races | Locked                 | Freewheel              |
| Finger Position        | 78                     | 88                     |
| Finger Thickness       | T1                     | T1                     |
| Pawl Toe Position      | Disengaged             | Disengaged             |
| Configuration of Races | Freewheel              | Freewheel              |

Those skilled in the art will appreciate that a wide variety of choices may be available for configurations as well as thicknesses of respective cam fingers. The enhanced array of choices may provide significant additional flexibility for clutch module designers over traditional approaches.

INDUSTRIAL APPLICABILITY

A clutch module that incorporates the axially acting actuator cam of this disclosure has potential application in a variety of applications including, but not limited to, vehicular transmissions and transfer cases. Perhaps even more generally, such a clutch module may be particularly useful in off-highway and industrial applications requiring selectable torque transfer between two rotating components.

The disclosed actuator may offer greater flexibility for clutch component design, including opportunities for significantly reducing size envelopes and/or packaging of clutch modules for automatic transmissions. Such benefits may result in enhancements for gearsets of transmissions and in numerous other applications where content density is desired to be minimized, and/or packaging space may be at a premium.

Although the disclosed actuator has been particularly described in only three embodiments, numerous additional embodiments and other configurations may fall within the scope of the appended claims.

What is claimed is:

1. An actuator for switching a multi-mode clutch module between modes, the module having an axis of rotation, an inner race and an outer race, each race extending circumferentially about the axis, and at least one engagement mechanism situated between the races; the actuator comprising:
    an actuator sleeve configured for rotation with one of the races of the clutch module;
    a cam finger depending from the sleeve,
    the cam finger configured to be axially moveable between a plurality of predetermined fixed positions, wherein the inner race includes a pair of side plates non-rotatably fixed together and including at least one aperture, and wherein the cam finger is configured to extend and move axially through the at least one aperture via axial movement of the actuator sleeve to cause interaction of the engagement mechanisms to selectively control torque between the races.

2. The actuator of claim 1, wherein the actuator sleeve is configured to rotate with the inner race.

3. The actuator of claim 1, wherein the cam finger defines an interior diameter of the actuator sleeve, and has a variable radial thickness along its axial dimension.

4. The actuator of claim 1, wherein the actuator sleeve is axially moveable with respect to both the inner race and the outer race.

5. The actuator of claim 1, wherein the pair of side plates further comprises a pair of aligned second apertures configured to support the engagement mechanism for pivotal movement thereof between the side plates.

6. The actuator of claim 1, wherein the at least one engagement mechanism includes a pawl rotatably contained between the pair of side plates, and wherein interaction between the cam finger and the pawl causes an angular shift of the pawl to selectively cause engagement and disengagement of the inner race and the outer race.

7. The actuator of claim 6, wherein the cam finger interacts with a heel portion of the pawl and the cam finger includes at least two thicknesses such that when the cam finger moves axially inward and outward with respect to the pawl a thicker portion of the cam finger interacts with the heel of the pawl.

8. The actuator of claim 6, wherein the at least one engagement mechanism includes a plurality of pairs of opposed pawls and the cam finger includes a width wide enough to simultaneously interact with a forward pawl and a reverse pawl of two adjacent pairs of opposed pawls of the plurality of pairs of opposed pawls.

9. An actuator for switching a multi-mode clutch module between modes, the module having an axis of rotation, an inner race and an outer race, each race extending circumferentially about the axis, and at least one engagement mechanism situated between the races; the actuator comprising:

an actuator sleeve configured for rotation with the outer race of the clutch module;

a cam finger depending from the sleeve, the cam finger configured to be axially moveable between a plurality of predetermined fixed positions, wherein the outer race includes a pair of side plates non-rotatably fixed together and including at least one aperture, and wherein the cam finger is configured to extend and move axially through the aperture via axial movement of the actuator sleeve to cause interaction of the engagement mechanisms to selectively control torque between the races.

10. The actuator of claim 9, wherein the cam finger defines an outer diameter of the actuator sleeve, and has a variable radial thickness along its axial dimension.

11. The actuator of claim 9, wherein the actuator sleeve is axially moveable with respect to both the inner race and the outer race.

12. The actuator of claim 9, wherein the pair of side plates further comprises a pair of aligned second apertures configured to support the engagement mechanism for pivotal movement thereof between the side plates.

13. The actuator of claim 9, wherein the at least one engagement mechanism includes a pawl rotatably contained between the pair of side plates, and wherein interaction between the cam finger and the pawl causes an angular shift of the pawl to selectively cause engagement and disengagement of the inner race and the outer race.

14. The actuator of claim 13, wherein the cam finger interacts with a heel portion of the pawl and the cam finger includes at least two thicknesses such that when the cam finger moves axially inward and outward with respect to the pawl a thicker portion of the cam finger interacts with the heel of the pawl.

15. The actuator of claim 13, wherein the at least one engagement mechanism includes a plurality of pairs of opposed pawls and the cam finger includes a width wide enough to simultaneously interact with a forward pawl and a reverse pawl of two adjacent pairs of opposed pawls of the plurality of pairs of opposed pawls.

16. A multi-mode clutch module having an axis of rotation, the clutch module including first and second races extending circumferentially about the axis, and at least one engagement mechanism situated between the races, the clutch module including an actuator for switching the clutch module between modes; the actuator comprising:

an actuator sleeve configured for rotation with one of the races of the clutch module;

a cam finger depending from the sleeve, the cam finger configured to be axially moveable between a plurality of predetermined fixed positions, wherein one of the races includes a pair of side plates being non-rotatably fixed together and at least one of the side plates has an aperture to accommodate axial movement of the cam finger there through to cause interaction of the engagement mechanisms to selectively control torque between the races.

17. The multi-mode clutch module of claim 16, wherein the cam finger is configured to accommodate a plurality of predetermined fixed positions for causing selective interaction of the engagement mechanisms with the other of the races as a function of axial position of the actuator sleeve.

18. The multi-mode clutch module of claim 16, wherein the cam finger is configured to selectively prevent torque transfer between the races, and to allow the first and second races to freewheel relative to one another in at least one direction in at least one modular clutch operating mode, and wherein the cam finger is configured to provide torque transfer between the first and second races in the at least one direction in at least a second modular clutch operating mode.

19. The actuator of claim 16, wherein the at least one engagement mechanism includes a pawl rotatably contained between the pair of side plates, and wherein the cam finger interaction with the pawl causes an angular shift of the pawl to selectively cause engagement and disengagement of the inner race and the outer race.

20. The actuator of claim 19, wherein the cam finger interacts with a heel portion of the pawl and the cam finger includes at least two thicknesses such that when the cam finger moves axially inward and outward with respect to the pawl a thicker portion of the cam finger interacts with the heel of the pawl.

* * * * *